April 7, 1936.   J. F. NISEWANGER   2,036,433
TRANSPLANTING IMPLEMENT
Filed April 8, 1935
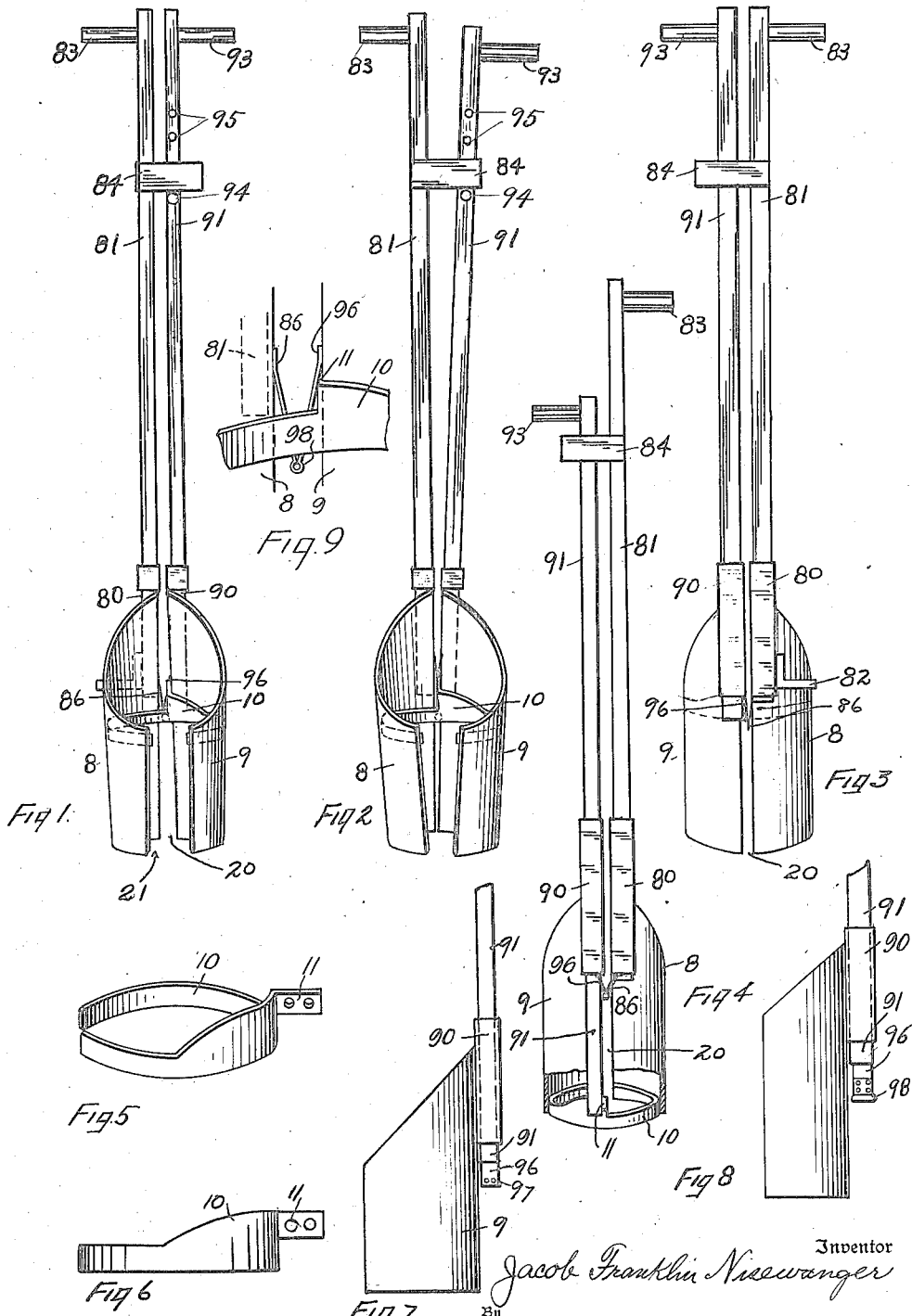

Patented Apr. 7, 1936

2,036,433

UNITED STATES PATENT OFFICE 2,036,433

TRANSPLANTING IMPLEMENT

Jacob Franklin Nisewanger, Orange Cove, Calif.

Application April 8, 1935, Serial No. 15,194

6 Claims. (Cl. 55—68)

My invention relates to a device for transplanting growing plants. It is well known that in the growing of vegetables, flowers and similar products it is customary to start the plants in a hot bed, or seed bed where a large number of plants can be started and grown in a small area, and under more favorable conditions than when planted in a field where they are grown for fruition, and where they are spaced apart at greater distances from each other than is necessary when they are small. When the plants are thus grown in a seed bed and are to be transplanted, such transplanting should be done with as little disturbance to the roots as possible.

The object of my invention is the construction of a transplanting implement whereby one can with certainty pick up the plant and the earth surrounding the roots without disturbing the roots as embedded in the earth, transport the plant to the place desired, and insert the plant in a hole prepared for it without disturbing the root system of the plant. Other objects will be disclosed hereinafter in this specification.

These objects are accomplished by means of the device hereinafter explained and illustrated in the drawing herewith, and which is hereby made a part of this specification, in which Fig. 1 is a front view of the device with the cutting blades in open relation.

Fig. 2 shows the device as illustrated in Fig. 1 except that the blades are in a closed relation.

Fig. 3 is a back view of the device with the plunger near the top of the blades.

Fig. 4 shows a back view of the device with the plunger near the bottom of the blades, having parts cut away.

Fig. 5 is a perspective top view of the plunger enlarged.

Fig. 6 is a side view of the plunger enlarged.

Fig. 7 is a fractional side view of the device.

Fig. 8 shows a modified form of hinge.

Fig. 9 is an enlarged front view of the hinge connecting the blades, and a fractional view of the blades and plunger.

The device consists of the following elements: The blades 8 and 9 are constructed of a metal formed as a channel so that when the blades 8 and 9 are assembled they form an approximately tubular member. To each of these blades is attached a handle support. These handle supports are attached together at the lower ends as hereinafter more definitely set forth. To handle support 80, which support is a part of blade 8, a handle 81 is rigidly attached. A bracket, or step 82 is attached near the lower end of handle 81. It is noted that said bracket or step 82 is intended to assist in forcing the blades into the earth, which is done by pressing on the step with the foot.

Handle support 90 is a part of blade 9. This handle support approximately surrounds handle 91 and forms a slideway for said handle 91 so that the handle can be moved up and down with relation to the blades. One purpose of sliding handle 91 is to actuate a plunger 10 which fits loosely within the tubular member formed by the assembly of the two cutting blades. Plunger 10 has a lip 11 thereon which may be coextensive with the height of the plunger. When assembled with the blade, lip 11 should extend through the slot 20. Slot 20 is formed by spacing the two blades apart when assembled to form the tubular member. Lip 11 is attached to the lower end of handle 91. In Figs. 1, 2 and 3 the plunger is shown near the top of the blades, and in Fig. 4 the plunger is shown near the bottom of the blades. A guide 84 is attached to handle 81 between the ends thereof, said guide being adapted to receive handle 91 and to permit said handle to be moved laterally and vertically. Grips 83 and 93 are attached to the handles to be used as hand holds in using the device.

At the lower end of handle supports 80 and 90 are extensions 86 and 96 which can be hinged together, thus connecting the blades 8 and 9. This hinge permits of a movement of the blades whereby the cutting edges can be moved slightly apart or close together. If the extensions 84 and 94 are made of springy material, such extensions can be riveted or bolted together by bolts 97, and the movement desired can be had without the hinge shown as 98. When thus assembled the blades are normally spaced apart, thus forming a slot 20 hereinbefore referred to, and a slot 21 parallel with and opposite to slot 20. Slot 21 should be made wide enough so that the stems of large plants, or small trees generally referred to as nursery stock to be transplanted can pass through the slot and between the blades. The plunger is in the form of an open ring, the opening therein registering with slot 21, so that the stem can pass inside of said ring.

It will be noted that the cutting edges of the two blades can be moved toward or from each other by manipulating handles 81 and 91, and guide 84 limits such movement.

In using this device the transplanter has its parts placed in the relation with each other shown in Fig. 4, having the handles approximately parallel and the plunger at the lowest point of its path of travel. The tool is then placed over the plant to be transplanted so the plant stem is in the approximate center of the plunger and assembled blades. The blades are then forced into the ground around the plant. The plunger remains on the top of the earth as the blades are forced into the earth. One object of my invention is to have the plunger function as a gage to limit the depth the blades are forced into the earth, so holes of uniform depth can be prepared in advance of transplanting, and the form of the earth surrounding the plant can fit snugly within this hole. For this purpose stop member 94 is placed on handle 91, the stop being adapted to engage guide 84 when the handle moves upward. I have a series of holes 95 in handle 91, the holes being adapted to receive and hold stop member 94. The object of this construction is for varying the adjustment of the stop.

When the tool is pressed into the earth as above described, the operator moves the handles to the position shown in Fig. 2, so that the lower ends of the blades cramp the ground surrounding the plant and thus hold the earth within or between the blades. The tool and the plant are then removed and inserted in a hole previously prepared. The handles are then pressed together as is shown in Figure 1 or 3 which movement releases the pressure of the blades against the earth between the blades, the plunger is firmly held on the top of the ground, and the blades are withdrawn, thus leaving the plant and surrounding earth within a hole into which it is fitted. The tool is then ready for the next successive operation.

It is here noted that the scope of this invention is not limited to small plants, such as may be grown in a garden, but is inclusive of all plants which are adapted for transplanting, including small trees and nursery stock.

It is also noted that when the plunger is held on the earth and the blades are withdrawn, the plunger will function to press the earth gently around the plant and fit the plant, and earth surrounding it tightly into the hole.

Having described my invention I claim as new and ask for Letters Patent:

1. In a plant transplanter, the combination of two curved blades hinged together with the concave sides of the blades adjacent to each other, said hinge being adapted to permit the cutting edges of said blades to be moved toward and from each other, a handle rigidly attached to one of said blades, a handle slidingly attached to the other blade, and a plunger attached to the sliding handle, adapted to move up and down within the space between the assembled blades.

2. In a device of the character described in claim 1, a stop on the sliding handle and an engaging member on the other handle, said stop and engaging member being adapted to limit the movement of the plunger.

3. In a transplanting device, the combination of two curved blades, each blade having a cutting edge at one end thereof, said blades being connected together a spaced distance apart and with the cutting edges at the same end of the device, said connection being adapted to permit the cutting edges of the blades to be moved slightly toward, and slightly from each other, a handle rigidly attached to one of said blades, a handle slidingly attached to the other blade, said sliding handle being adapted to be moved lengthwise on said blade, said handles being adapted to move the blades toward and from each other as hereinbefore set forth, and a plunger loosely fitted within the assembled blades, attached to the sliding handle, and adapted to slide within the assembled blades by sliding said handle attached thereto.

4. A device described in claim 3 having the portion of the plunger disposed within the assembled blades in the form of an open ring, the opening therein registering with the slot or opening between the assembled blades.

5. In a device for transplanting plants, the combination of two concave blades, each blade having one end thereof formed with a cutting edge, said blades being pivotally attached together between the ends thereof, a handle rigidly attached to one of said blades, a handle slidingly attached to the other blade, said handles being attached so that they are approximately parallel with each other when the blades are parallel, said handles being adapted to move the blades on their pivotal connection, said blades being assembled together with a space between them, a plunger comprising an open ring adapted to loosely fit between the assembled blades, means for attaching the plunger to the sliding handle, the plunger being adapted to be moved with said handle.

6. A transplanting implement described in claim 5, having stop means adapted to limit the path of travel of the plunger.

JACOB FRANKLIN NISEWANGER.